MAGNETIC SWITCHING

Filed Aug. 12, 1957 2 Sheets-Sheet 1

INVENTORS
THOMAS D. ROSSING
ARNDT B. BERGH

BY Cushman, Darby & Cushman
ATTORNEYS

INVENTORS
THOMAS D. ROSSING
ARNDT B. BERGH

BY Cushman, Darby & Cushman
ATTORNEYS

United States Patent Office 3,004,243

Patented Oct. 10, 1961

3,004,243

MAGNETIC SWITCHING

Thomas D. Rossing, St. Paul, Minn., and Arndt B. Bergh, Palo Alto, Calif., assignors to Sperry Rand Corporation, New York, N.Y., a corporation of Delaware Filed Aug. 12, 1957, Ser. No. 677,507
27 Claims. (Cl. 340—174)

This invention relates to novel means for changing the magnetic state of a bi-stable magnetic core and to a memory matrix employing same.

To increase the switching rate of a magnetic core from either of its stable remanent magnetization states to the other, it has been found that the application of a high frequency or "shaking" field to a magnetic core so as to disturb or distort the remanent flux thereof in time coincidence with a field which opposes the then existing remanent magnetization of the core, considerably increases the speed of the switching. To cause the shaking field, a pulsating current is employed to introduce a field in the core which is either transverse, partially transverse, or non-transverse to the remanent magnetization. Either of these types of shaking fields will sufficiently disturb the remanent magnetization so as to allow a conventional switching field, or even a field which will not alone switch the core, to readily cause switching of the core. The shaking field may be produced either by a unidirectional or an alternating pulsating current.

Such a shaking field may be employed to cause faster switching of a core, or for a given switching time may be used to allow a reduction in the magnitude of the coincident field which opposes the remanent magnetization, regardless of the circuitry in which the core is being utilized. One particularly advantageous manner of utilizing a shaking field is in a memory matrix, although limitation thereto is not intended, since the shaking field aspects of this invention may be employed with cores regardless of their use.

To increase operating speeds and reliability of electronic automatic digital computing machinery, emphasis has recently been placed on non-destructive sensing of static magnetic memories and other static magnetic devices. It is difficult to add non-destructive sensing means economically to a conventional memory array, for example, since the non-destructive interrogating windings are parallel to the memory register, whereas the conventional write windings are perpendicular to the register. In a sizable conventional memory core array or matrix, the additional number of inter-plane lines and solder connections necessary for non-destructive sensing is tremendous, thereby making the cost prohibitive.

It is therefore the primary object of this invention to provide a bi-stable magnetic element device which may be switched in an exceedingly fast time by the use of a shaking field in conjunction with anohter field which opposes the remanent magnetization of the core.

Another object of this invention in conjunction with the foregoing object is the production of the shaking field by either an alternating or unidirectional pulsating current.

Still another object of this invention is the provision for a magnetic core of a shaking field which is either transverse, partially transverse or non-transverse to the remanent magnetization of the core to increase the switching speed of the core.

A further object of this invention is to provide for a magnetic core array a switching system which is compatible with non-destructive sensing in the array.

Another object of this invention is to provide an efficient system for including both non-destructive sensing and switching in a magnetic core array.

Still another object of this invention is to decrease the number of solder connections necessary for constructing a memory matrix from that necessary for a coincident current type matrix.

Still other objects of this invention will become apparent to those of ordinary skill in the art by reference to the following detailed description of the exemplary embodiments of the apparatus and the appended claims. The various features of the exemplary embodiments in accordance with the invention may be best understood with reference to the accompanying drawings, wherein:

Figure 1:
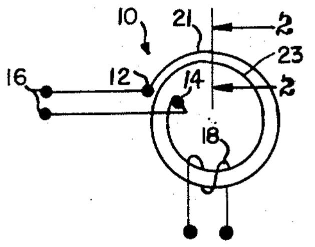
FIGURE 1 is a schematic illustration of a metallic ribbon magnetic core with connections for utilizing a shaking field.

In FIGURE 1, a length of bi-stable magnetic material is coiled into the form of a metallic ribbon core 10, normally wound on a bobbin (not shown) in the usual manner. The metallic ribbon preferably has a rectangular hysteresis loop characteristic with its remanent magnetization being along the easy axis or direction of magnetization which is preferably the lengthwise direction of the ribbon. In accordance with this invention, the remanent state of magnetization, whether in either of its two directions, may be reversed by causing a shaking field to be introduced in the metallic ribbon core 10. This shaking field may be applied by coupling the ribbon, preferably at ends 12 and 14, thereof, to a source of pulsating current available at terminals 16. A pulsating current as it traverses the coil from terminal 12 to terminal 14, sets up a flux in the core which is transverse to the remanent directions of magnetization. For switching the remanent magnetization of the core according to the principles of this invention, a stream of short duration pulses of comparatively high frequency, is applied to the coil in time coincidence with a writing or switching pulse in winding 18. The direction of the current in winding 18 determines the new direction of remanent magnetization, i.e., whether a binary "1" or "0" is stored in the ribbon core 10.

Figure 2:
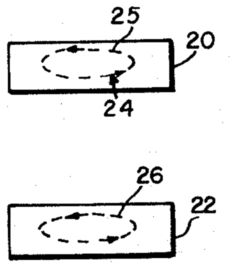
FIGURE 2 is an enlarged cross-sectional view of the core of FIGURE 1 taken on the line 2—2.

An explanation of the operation of the magnetic device of FIGURE 1, may best be understood in conjunction with FIGURE 2, which illustrates an exploded cross-sectional view of the two layers of ribbon on the line 2—2. The upper layer 20 corresponds to the top layer 21 of ribbon 10 along line 2—2 of FIGURE 1, while the lower layer 22 corresponds to the lower layer 23 along line 2—2 of FIGURE 1. During the occurrence of each current pulse of a given polarity introduced in the ribbon core 10 of FIGURE 1 from terminal 16, the magnetic field produced internally of the upper layer 20 is as shown by dotted line 25 with arrows 24 indicating the direction of the induced flux. At the same time, layer 22 will have a flux introduced therein in a corresponding direction as indicated by the dotted line 26 along with its arrows.

Figure 3:
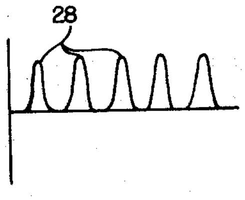
FIGURE 3 illustrates unidirectional impulses which may be utilized to generate a shaking field in the ribbon core of FIGURE 1.

Assuming the pulsating current coupled to terminals 12 and 14 of FIGURE 1 is a unidirectional current such as that indicated in FIGURE 3, the fields 24 and 26 of FIGURE 2 will exist as a result of each of the pulses 28 in FIGURE 3, but will relax between each two succeeding pulses of current. Therefore, the field caused by the pulsating current to terminal 16 of FIGURE 1 may be referred to as a "shaking field."

Figures 4, 5, 6, 7, 8:
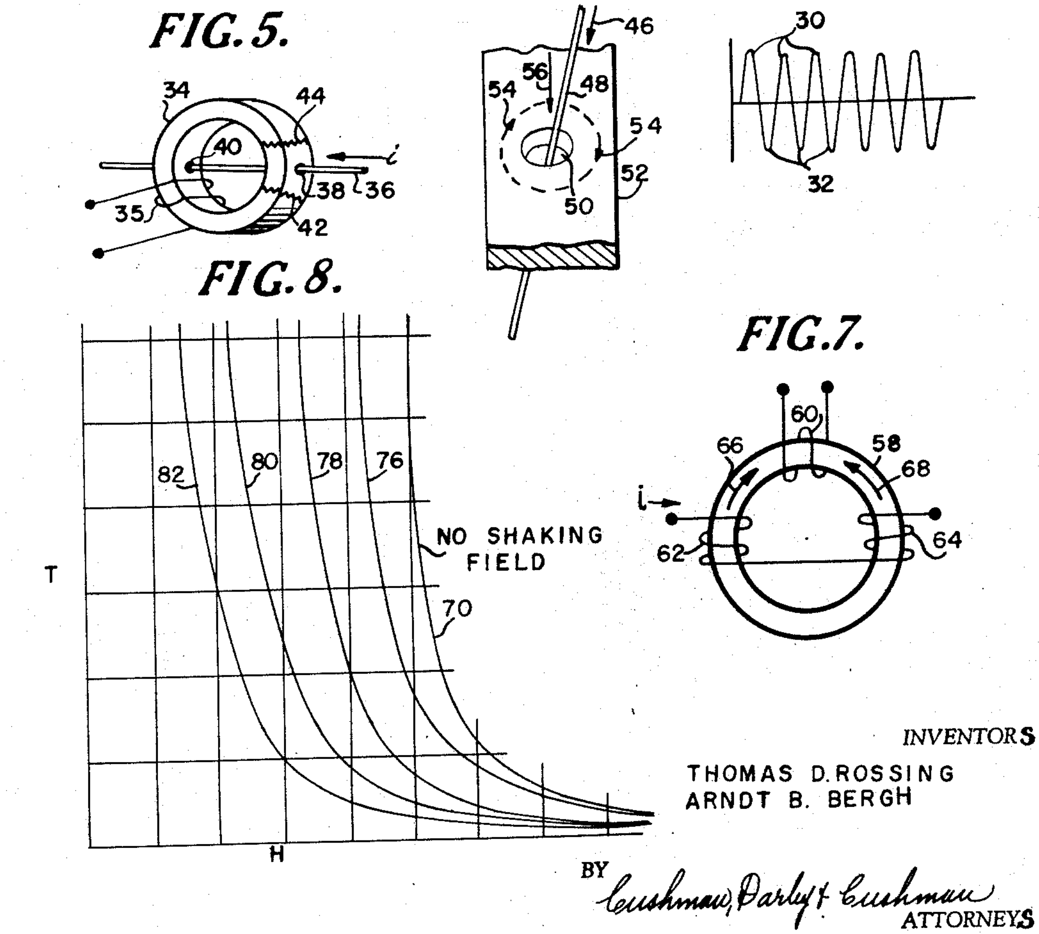
FIGURE 4 illustrates an alternating pulsating current which may be employed to generate a shaking field.
FIGURE 5 is an illustration of a magnetic core adapted for use with this invention.
FIGURE 6 is an enlarged view of a section of the core of FIGURE 5.
FIGURE 7 shows another embodiment of a closed core adapted for use with this invention.
FIGURE 8 is a graph illustrating the effect of a shaking field on the switching times of magnetic cores.

A bidirectional pulsating current may also be utilized at terminals 16 to cause a shaking field in the magnetic core 10 of FIGURE 1. Such a bidirectional pulsating or alternating current is illustrated in FIGURE 4. Upon the occurrence of each of the positive pulses 30, the magnetic fields 24 and 26 of FIGURE 2 may exist, for example. However, when the pulsating current to terminals 16 of FIGURE 1 is reversed so that the negative pulses 32 traverse the coiled ribbon core 10, the magnetic fields 24 and 26 of FIGURE 2 will also reverse. It is therefore apparent that the transverse magnetic field induced in the ribbon core 10 of FIGURE 1 when a bidirectional pulsating current is coupled to the core, is an alternating shaking field, rather than a unidirectional shaking field as is caused by the unidirectional pulses of FIGURE 3.

Even though the invention is illustrated in FIGURE 1 in connection with a coiled core, it is to be underestood that the length of magnetic material may be not only in the form of a coil, but also in the form of any other desired configuration including a straight flat piece of any thickness and length.

With the use of unidirectional pulses to cause the shaking field in the coiled ribbon core 10 of FIGURE 1, it is apparent that the shaking field since it is transverse to the remanent magnetization, aids the remanent magnetization periodically in its rotation to an opposite direction. However, with the use of an alternating current for causing the shaking field, such a ready explanation of the theory of operation is not available since seemingly the shaking field alternately aids and opposes rotation of the remanent magnetization in a given direction.

Without limitation intended, the following theory of operation is set forth. It is known that there are "potential hills" or "barriers" which exist in ferromagnetic materials, and it is beileved that there is an energy coupling between the shaking field which enables the moving domain walls to traverse these "potential hills" which otherwise would stop the wall motion. Rotation of the total magnetization is effected whether unidirectional or bidirectional pulsating current is employed to cause the shaking field. However, this does not mean that the remanent magnetization can be considered by a single vector which rotates, for example, especially when theorizing about the operation of a shaking field induced by alternating current. In fact, the magnetic domains of the material individually rotate, but this does not necessarily infer uniform rotation of the domains, or rotation thereof in the same direction throughout the magnetic mass. Some domains rotate in one direction, while others in another, and perhaps still others in other directions, with the resultant that the total remanent magnetization is reversed. The potential hills are overcome by the shaking field and regardless of the direction of individual domain rotation, the magnetization in the original direction is reduced in each domain. Thus, the magnetization rotates varying amounts but always away from its original remanent direction in accordance with the energy coupling theory.

FIGURE 5 illustrates another well known form which bi-stable magnetic material may take. The toroidal core 34 is provided with a switching winding 35 which when receiving current in an appropriate direction will cause switching of the core by itself. However, fastener switching may be accomplished by simultaneously introducing a shaking field into the core. In FIGURE 5 this is accomplished by passing a winding, which is preferably in the form of a straight wire 36, through apertures 38 and 40 drilled transversely of the core so as to be substantially perpendicular to the remanent magnetization axis. These apertures as illustrated are on a diameter of the core, but as will be apparent hereinafter, they may as well be on a chord thereof.

FIGURE 6 may be considered as a bar-shaped or flat magnetic core within itself, or can be considered as a portion of the core 34 between the lines 42 and 44. The explanation of the operation of the shaking field in conjunction with FIGURE 6 will proceed as though FIGURE 6 is a portion of the core of FIGURE 5, limitation thereto not being intended.

A pulse of current which proceeds in the direction of arrow 46 on current conductor or winding 48 as it passes through aperture 50 of core 52 sets up a flux about the aperture in the direction shown by the dotted line and arrows 54. If the remanent magnetization of the core is in the direction of vector 56, it is apparent that the induced flux partially aids the remanent magnetization, partially opposes the remanent magnetization, and is partially transverse thereof in both directions, all at any one instant. However, the remanent magnetization will be reversed as long as the current through winding 48 is pulsating. Preferably, bidirectional current pulses are employed since more complete switching of the remanent magnetization is thereby caused in a shorter time.

Another modification of this invention which most preferably, but not necessarily, employs bidirectional pulsating current, is shown in FIGURE 7. The magnetic core 58 has not only the usual switching winding 60, but also two other windings 62 and 64. These latter two windings are connected to a source of pulsating current and are so-related with each other and to core 58 that upon each current pulse of a given polarity, opposing fields 66 and 68 are produced. These fields are along the axis of remanent magnetization of core 58. Of course, if alternating current is passed through windings 62 and 64, flux vectors 66 and 68 will each be in a reverse direction for an opposite polarity pulse. To obtain the pulsating fields in core 58, the windings 62 and 64 may be wound in opposition and connected in series as illustrated. However, limitation thereto is not intended since opposing fields may be produced by passing pulsating current through similarly wound windings with corresponding ends thereof being connected in opposite polarity senses in parallel to one source or two sources respectively, for example. Oppositely wound windings may also be connected respectively to two alternating sources which are 180° out of phase. Any other manner of obtaining the shaking field for the core configuration of FIGURE 7 is intended to be included in this invention.

From the foregoing, it is apparent that the shaking field in the embodiment of FIGURE 7 is non-transverse to the remanent magnetization, whereas the shaking field of the embodiment of FIGURE 5 is partially transverse, while the shaking field of the embodiment of FIGURE 1 is wholly transverse of the remanent magnetization.

It is to be understood that the windings 62 and 64 of FIGURE 7 need not be disposed on a diameter of core 58 but may be adjacent one another or at any desired intermediate position with the results being comparable in all cases.

The energy coupling theory mentioned above relative to FIGURE 1, is also believed to be the theory by which the embodiments of FIGURES 5, 6 and 7 operate, although the theory of the switching operation of these latter embodiments is not fully understood.

Even though the magnetic elements of FIGURES 5 and 7 are shown as toroids, other closed flux path or endless configurations are usable as well with a shaking field.

The effect of the shaking field, when applied as described above, on the switching behavior of the megnetic elements of any of the foregoing embodiments, is illustrated generally in FIGURE 8 wherein T denotes the switching time, generally expressed in microseconds, and H is the main switching field in oersteds. For curve 70, no shaking field was applied, and only the field caused by current in the usual switching winding produced the switch. Curves 76, 78, 80 and 82 are the result of employing pulsating currents of increasing magnitude, for example, 200 ma., 400 ma., 600 ma. and 800 ma., respectively. From these curves it can be seen that as the amplitude of the pulsating current increases, switching time decreases for a given switching field strength. It is also apparent from the graph of FIGURE 8 that a shaking field may substantially aid in the switching of a core by reducing the magnetic field strength necessary to cause switching in a given time. At lower switching field strengths, the effect of the shaking field is more pronounced. A change in the wave shape of the pulsating current causing a shaking field also has considerable effect particularly as the change effects the current pulse integral and the effective amplitude thereof. The effectiveness of the shaking field also varies with frequency up to approximately two megacycles. Above this value, the effect of frequency variation is less noticeable. The two megacycle value of the pulsating current is preferred for causing optimum switching.

Figure 9:
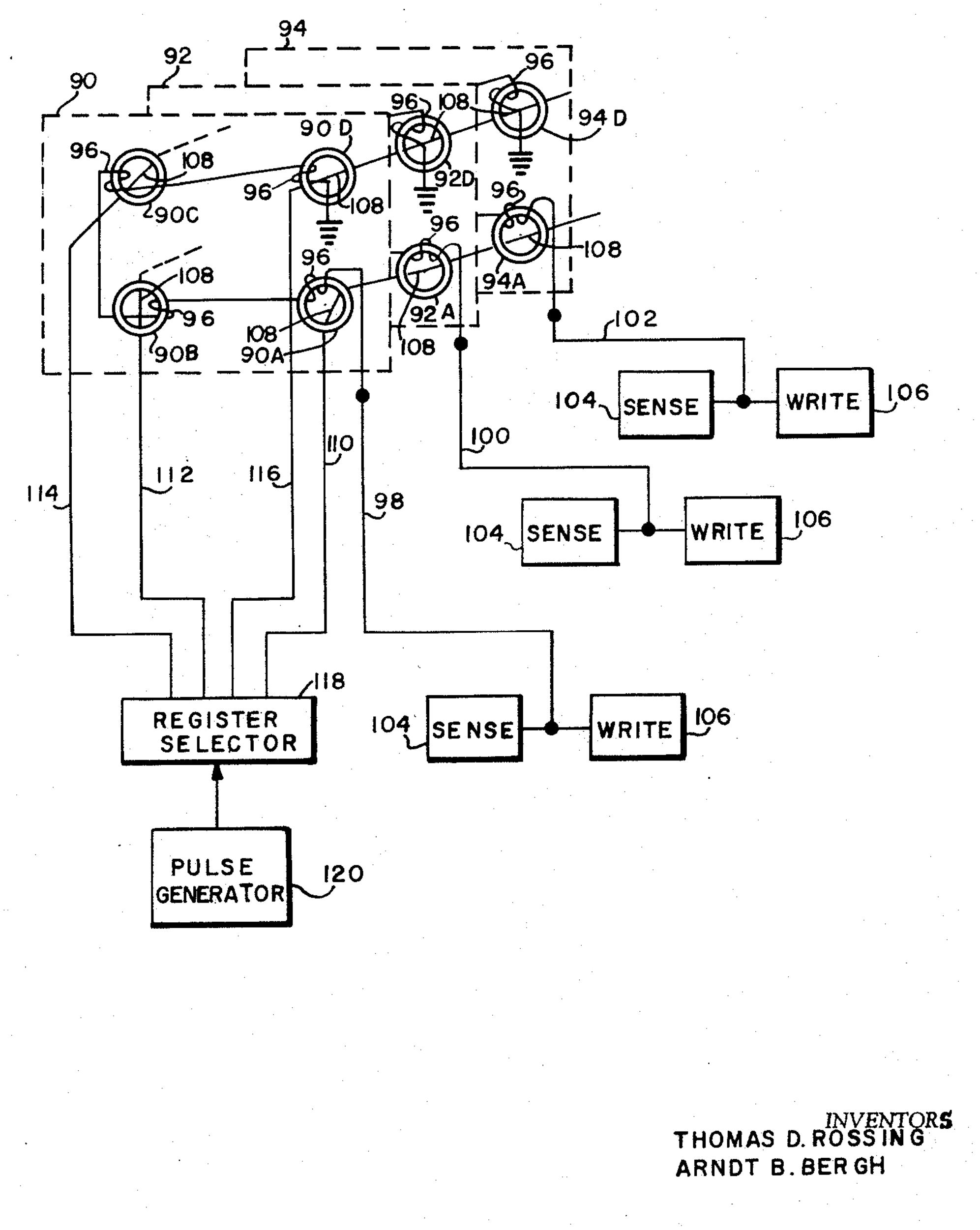
FIGURE 9 is a schematic diagram of a magnetic memory matrix embodying this invention.

FIGURE 9 illustrates an application of one embodiment of the novel switching or writing techniques hereinbefore described, as it is applied to a simple ferrite core memory matrix. In addition to the writing techniques, FIGURE 9 illustrates non-destructive sensing system which may conveniently be combined therewith by the aid of only one additional piece of equipment and without any additional solder connections in combining the matrix planes.

The memory matrix, as illustrated in FIGURE 9, comprises three planes, 90, 92 and 94, and each has four bistable magnetic elements 90A, 90B, 90C and 90D, etc., arranged in a 2 × 2 array. As is conventional, elements 90A, 92A and 94A in combination form one storage register, and elements 90D, 92D and 94D form another. Elements 90B and 90C are also parts of two other different storage registers in combination with elements (not shown) on planes 92 and 94. It is to be understood that any of the magnetic elements on any one of the planes may be of toroidal configurations as illustrated, or may have any other closed flux path configuration or may be of the coiled or flat type as desired.

The magnetic elements in each plane have a winding 96. These windings are connected in series within each plane, and the planes thereof are coupled via lines 98, 100 and 102, respectively, to three sets of sense-write circuits 104, 106. Each element also includes a conductor which passes through the element in the manner illustrated in FIGURE 5. That is, conductor 108 extends from one side to the other of core 90A through apertures drilled along a chord or diameter of a core element, the main point being that each of conductors 108 extends transversely through the closed flux path of the element with which it is associated at least once. Each of the conductors 108 for the different core elements in a storage matrix are connected in series and further extend respectively via lines 110, 112, 114 and 116 to a register selector 118. Pulse generator 120 supplies the pulsating current to the register selector 118 which gates the pulsating current to the different core elements in any one of the storage registers in accordance with whether sensing or writing is to take place therein.

In operation, a shaking field is produced in the core elements for a given register, while an appropriate writing field is produced in the winding 96 on the core which is to be shifted. That is, if core 90A is to have a "1" written therein, register 118 gates a stream of pulses from generator 120 to the conductor 108 over line 110 whereby a shaking field is produced in core 90A. This occurs in time coincidence with a writing pulse on line 98 which causes a field to be produced in core 90A from winding 96. In this embodiment, it is to be understood that the field from winding 96 alone will not shift the core but that the shaking field therewith will cause switching. The core is thereby switched to its "1" state if not already therein. If core 90B rather than core 90A is to be switched, the same writing pulse on line 98 is employed but the pulsating current is gated by register selector 118 to line 112.

For sensing, the same apparatus as that employed for writing may be used along with the addition of a sensing circuit 104. To cause sensing, the register selector 118 gates preferably just one pulse to the register which is to be sensed. When the register including cores 90A, 92A and 94A is to be sensed, a pulse is gated to line 110 to cause a momentary disturbance in the remanent magnetization in each of the core elements. This pulse causes a momentary decrease in the remanent magnetization in one direction or another in accordance with the remanent states of the different cores. Sensing circuits 104 in conjunction with windings 96 of register A and the voltage therein induced, sense the polarity of the change of the remanent magnetization in the cores, but no change of state of the cores takes place since the field produced by the sensing pulse on line 110 is insufficient to switch the cores. Since no voltage is induced in windings 96 for registers B, C and D, when a pulse is present on line 110 only, sensing will only be of the register which includes the A cores. To sense the other registers, the appropriate one of lines 112, 114 or 116 is energized with a sensing pulse.

In accordance with the invention as described relative to FIGURES 1 through 8, the pulsating current from generator 120 may be either unidirectional or alternating for producing the shaking field in FIGURE 9. For toroidal cores of the type illustrated in FIGURE 9 with the shaking field therein being produced inductively in partially transverse and partially non-transverse directions, the pulsating current is preferably alternating. Although sensing is preferably accomplished by a single pulse of a given polarity, a full cycle of alternating pulses, or a stream of unidirectional or alternating pulses may be utilized to provide sensing. The register selector 118 may be of a conventional type to accomplish the gating as between lines 110 through 116 for either sensing or writing. For example, pulsating current from generator 120 may be gated to lines 110, 112, 114 or 116 through four different register gates which are each enabled by different flip-flops for releasing a stream of pulses, or by an individual pulse for releasing a single pulse for sensing purposes. Of course, the matrix of FIGURE 9 is exemplary only since obviously more cores per plane and more or less planes may be utilized.

One of the main advantages of a memory matrix of the type illustrated in FIGURE 9 is that there are less physical intra-plane and inter-plane connecting lines and less solder (or the like) connections which need to be made for each plane to form a matrix and place it in operation, than there are for matrices of the coincident current type. That is, in the conventional coincident current matrix, there are two drive lines for each core plus a sense-inhibit line, not to mention non-destructive sensing windings which may be employed. Each drive line threads the cores in one column or row thereof in a plane, and extends to the corresponding column or row in the next plane, etc., while the sense-inhibit windings thread the cores in a single plane.

In a calculation of the number of solder connections which are necessary to form a complete coincident current matrix, it becomes evident that there are $2(N-1)(X+Y)$ such connections between planes wherein N is the number of planes, X is the number of horizontal drive lines and Y is the number of vertical drive lines. Additionally, there are $2(X+Y)$ external solder connections for the whole matrix, including the ground connections. The sense-inhibit solder connections, including ground, are $2N$, and this may at times double since there are often two wires used for sensing purposes. When non-destructive readout is incorporated into a coincident current memory, the number of solder connections increases considerably. Since there is then additionally necessary a new line between each of the planes for each register, the total number of inter-plane solder connections for non-destructive sensing equals $2(N-1)XY$ plus the energizing connections, including ground, which equal $2(X+Y)$. For a 36 bit word memory ($N=36$ planes) consisting of a $32 \times 32$ element configuration for each plane ($X=Y=32$) whereby 1,024 word registers are provided, the total number of solder connections when non-destructive readout is employed in conjunction with a single wire inhibit line for each plane is 76,488.

When a memory is constructed as illustrated in FIGURE 9, the reduction in solder connections is 4,608 for a 36 plane $32 \times 32$ core array. Generally speaking, there are $2(N-1)(X+Y)+2(X+Y)$ solder connections eliminated by this invention. The actual number of solder connections for a matrix made in accordance with FIGURE 9 includes $2(N-1)XY$ connections between planes, $2(X+Y)$ external connections for the shaking field lines plus 2N connections for the write-sense lines. Therefore, for a $32 \times 32$ matrix with 36 planes, a total of 71,880 solder connections are necessary, a reduction of approximately 6%.

An even greater reduction is accomplished by a memory configuration like that shown in FIGURE 9, when the number of intra-plane lines and inter-plane lines are considered for such a matrix in comparison to a coincident current matrix. Calculating in a manner similar to that outlined above for the number of solder connections, it becomes apparent that the number of intra-plane lines for a coincident current matrix is $N(X+Y)$ drive lines plus N inhibit lines plus NXY lines for non-destructive sensing, and the number of inter-plane lines is $XY(N-1)$ for the drive lines plus the same for the non-destructive sensing lines. For a 36 plane, $32 \times 32$ array, the number of intra-plane lines is 39,204, and the number of inter-plane lines is 71,680, making a total for the whole matrix of 110,884.

In comparing the number of lines necessary for a matrix constructed in accordance with FIGURE 9 with a coincident current matrix, it becomes apparent that the number of write-sense lines for FIGURE 9 is N and the number of shaking field lines is NXY, making a saving of $N(X+Y)$ intra-plane lines. For a 36 plane, $32 \times 32$ array, 2,304 lines less are used, representing almost another 6% saving. The number of inter-plane lines for a matrix in the form of FIGURE 9 is NXY, the shaking field lines only interconnecting the planes. This represents a saving of $XY(N-2)$ lines, which for a 36 plane, $32 \times 32$ memory array, is 34,816 lines, a reduction of almost 50%. The total number of intra- and inter-plane lines for a matrix constructed in accordance with this invention is 37,120 for a 36 plane, $32 \times 32$ array, representing one-third less lines necessary when for a similar coincident current matrix.

From the foregoing, it is apparent that by this invention the considerable reduction in the necessary number of solder connections and connecting lines represents an enormous reduction in time and expense from that necessary to construct a coincident current type matrix. This invention thereby provides an improved and efficient memory system.

Thus it is apparent that there is provided by this invention apparatus in which the various objects and advantages herein set forth are successfully achieved.

Modifications of this invention not described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. A bi-stable device comprising magnetic material having a substantially rectangular hysteresis loop characteristic so as to exhibit only two stable states with the remanent magnetization of the material at any given time being in one of two possible opposing directions corresponding to said states, means for introducing a flux in said magnetic material in one of said directions to oppose the then existing remanent magnetization, and means for introducing a shaking magnetic field in said device during introduction of said flux to aid in switching magnetic material from its existing stable state to its other stable state.

2. A device as in claim 1 wherein the shaking field comprises a plurality of unidirectional pulses.

3. A device as in claim 1 wherein said shaking field comprises a plurality of alternating pulses.

4. A device as in claim 1 wherein said magnetic material is a length thereof and wherein the shaking field means includes means connected to said length for carrying a pulsating current.

5. A device as in claim 1 wherein said magnetic material has at least one aperture substantially perpendicular to the remanent magnetization directions and wherein the means for introducing the shaking field includes conducting means passing through said aperture for carrying a pulsating current.

6. A device as in claim 5 wherein said pulsating current is alternating.

7. A device as in claim 1 wherein said magnetic material forms a closed configuration.

8. A device as in claim 7 wherein the closed configuration has two apertures each at least substantially perpendicular to the remanent magnetization directions at the respective points where the apertures pass through the magnetic material and wherein the means for introducing the shaking field includes conducting means passing through said apertures for carrying a pulsating current.

9. A device as in claim 8 wherein the pulsating current is alternating.

10. A device as in claim 1 wherein said magnetic material is a toroid and has two apertures therein substantially at either end of a chord of the toroid, and wherein the means for introducing said shaking field includes conducting means passing through both of said apertures for carrying a pulsating current.

11. A device as in claim 10 wherein said chord is a diameter of the toroid.

12. Apparatus as in claim 10 wherein the pulsating current is alternating.

13. A device as in claim 1 wherein the means for introducing said shaking field includes means for receiving a pulsating current to produce first and second portions of said shaking field simultaneously, said first and second portions being in opposition to each other and substantially along said remanent magnetization directions.

14. A device as in claim 1 wherein said magnetic material forms a closed configuration and wherein the means for introducing said shaking field includes different means each for receiving pulsating current to produce simultaneously first and second portions of said shaking field in opposition to each other and along said remanent magnetization directions respectively upon the occurrence of each pulse of said current.

15. A device as in claim 14 wherein said different means are two windings inductively related to the closed configuration.

16. A device as in claim 14 wherein said pulsating current is alternating.

17. A memory matrix comprising a plurality of planes each having a plurality of bi-stable magnetic elements, one element in each plane in combination being a storage register, means for each element inductively related thereto, means in each plane for coupling the inductively related means in series, writing means for applying to each element in any plane via the said series coupled means a first field which alone is insufficient in amplitude to switch the respective element, means for each magnetic element for introducing a shaking field therein concurrently with said first field to cause switching of that element including means for each storage register for interconecting the field introducing means in series, and means for selecting any one register to allow introduction of respective shaking fields into the elements thereof whereby the registers may be selectively written into.

18. In a memory array, a plane of bi-stable magnetic elements, means for each element for introducing a shaking field therein, and means for inducing a second field in each element in time coincidence with said shaking field, the arrangement being such that a simultaneous application of a shaking field and said second field to any one element causes a switching thereof if the element is in a state so as to be switched thereby.

19. A memory matrix comprising a plurality of planes each having a plurality of bi-stable remanent state magnetic elements, one element in each plane in combination being a storage register, means for each element inductively related thereto, a set of sense and write means for each plane, the latter for producing a binary writing pulse and the former for sensing the remanent state of elements associated therewith, means for coupling the inductively related means in each plane to the sets of sense and write means respectively, generator means for producing a pulsating current, means including selector means for separately providing the pulsating current to each storage register to cause a field in the elements therein, the arrangement being such that a binary digit is written in a given magnetic element only upon the occurrence of a writing pulse in time coincidence with a pulsating current composed of a plurality of pulses so that said field is a shaking field, non-destructive sensing of the elements in a given storage register being caused by the provision thereto in the absence of any writing pulse of at least one pulse of said pulsating current to cause an indication to the different sense means of the respective magnetic states of the elements in said given storage register.

20. A memory matrix as in claim 19 wherein said generator means produces an alternating pulsating current.

21. A memory matrix as in claim 19 wherein said generator means produces a unidirectional pulsating current.

22. A memory matrix as in claim 19 wherein the magnetic elements each form a closed flux path and wherein the means for separately providing the pulsating current to each storage register include a conductor extending between the magnetic elements in each register and through the closed flux paths of the elements therein in a direction substantially transverse to the remanent magnetization of the elements.

23. A memory device comprising bistable magnetic material having remanent magnetization switchable by the end of a predetermined time from the existing one of its two stable conditions to the other by a single field applied in opposition to the existing remanent magnetization only if the amplitude of that field equals or exceeds a given amplitude, means for applying to said material in opposition to the existing remanent magnetization thereof a first field having an amplitude less than said given amplitude whereby the remanent magnetization fails to switch within said predetermined time in response to said first field alone, and means for applying to said material concurrently with said first field a shaking field to cause switching of the material remanent magnetization to its other stable condition at least by the end of said predetermined time due to the conjoint action on the material of the said first and shaking fields.

24. A memory device comprising bistable magnetic material having remanent magnetization switchable by the end of a predetermined time from the existing one of its two stable conditions to the other by a single field applied in opposition to the existing remanent magnetization only if the switching amplitude of that field equals or exceeds a given threshold value, means for applying to said material in opposition to the existing remanent magnetization thereof a first field having an amplitude substantially equal to said given threshold value for causing switching of the remanent magnetization substantially at the end of said predetermined time in response to said first field alone, and means for increasing the switching speed of said material including means for applying to said material concurrently with said first field a shaking field to cause switching of the material remanent magnetization to its other stable condition in a time less than said predetermined time due to the conjoint action on the material of the said first and shaking fields.

25. A device as in claim 1 wherein the shaking field introducing means causes the shaking field in said material to be in a direction substantially transverse to both of said opposing directions.

26. A device as in claim 1 wherein the shaking field introducing means causes the shaking field in said material to be in directions transverse, partially transverse and non-transverse to both of said opposing directions.

27. A device as in claim 1 wherein the shaking field introducing means causes the shaking field in said material to be in directions substantially non-transverse to both of said opposing directions.

References Cited in the file of this patent

UNITED STATES PATENTS

| | | |
|---|---|---|
| 2,802,953 | Asenault | Aug. 13, 1957 |
| 2,820,109 | Dewitz | Jan. 14, 1958 |
| 2,832,062 | Tracy | Apr. 22, 1958 |